Patented July 5, 1932

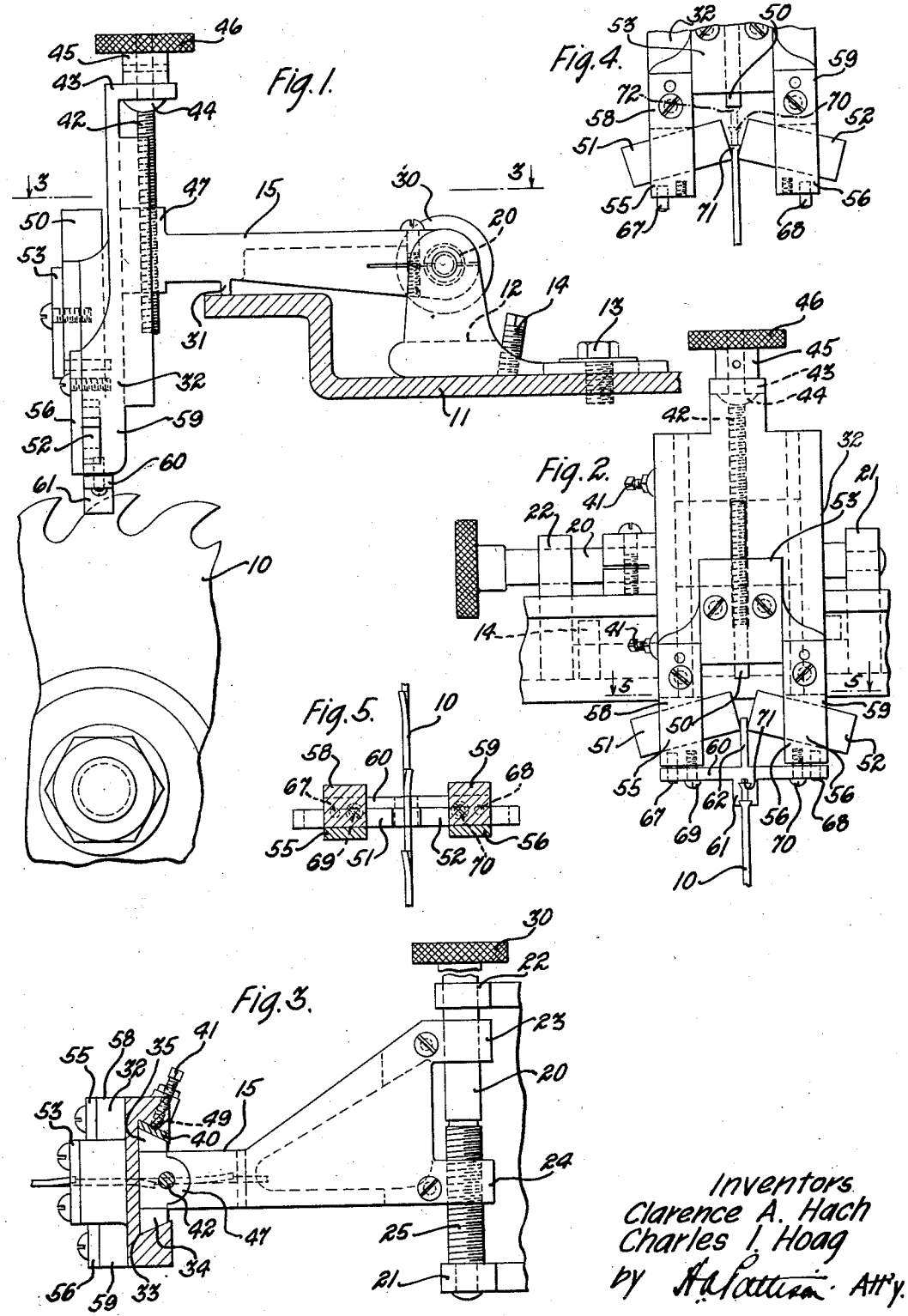

1,866,101

UNITED STATES PATENT OFFICE

CLARENCE ALBERT HACH, OF OAK PARK, AND CHARLES IRVING HOAG, OF CHICAGO, ILLINOIS, ASSIGNORS TO WESTERN ELECTRIC COMPANY, INCORPORATED, OF NEW YORK, N. Y., A CORPORATION OF NEW YORK

APPARATUS FOR SHAPING SAW TEETH

Application filed April 18, 1928. Serial No. 270,862.

This invention relates generally to an apparatus for shaping saw teeth, and more particularly to an apparatus for dressing and jointing circular rip saws.

Considerable experimentation has been conducted in the past for the purpose of finding some apparatus that would dress and joint a saw in such a way that the saw would produce a sawed edge or surface possessing a degree of smoothness sufficient to obviate the necessity of a subsequent planing or jointing operation. Such apparatus is particularly needed in connection with saws used to cut wood for glued joints, in which case it is necessary that the edges or surfaces receiving the glue be smooth in order that the joined pieces will adhere to each other and form a strong joint.

The object of this invention is to provide an apparatus for dressing and jointing a saw while the saw is being actuated at its normal operating speed, so that the saw will produce a smooth surface or edge on the wood.

In accordance with the general features of the invention there is provided an apparatus for dressing and jointing the saw while the saw is in operating position in the sawing machine and while the saw is running at its normal operating speed. The reason for dressing and jointing the saw while it moves at its operating speed is that the saw may then assume a slightly different shape from what it takes when moving at only partial operating speed or when stationary. The apparatus consists generally of a pair of abrasive members for dressing the sides of the teeth and of an abrasive member for jointing the tops of the teeth. The three abrasive members, which may be files or may consist of carborundum or a like abrasive substance, are adjustably mounted in a unitary support which is slidably attached to the end of an adjustable arm which may be mounted on the frame of any ordinary sawing machine. A gauge is removably attached to the unitary support for aligning the abrasive members with the saw and for determining their relative adjustment.

A clear understanding of the invention may be had from the following detailed description of one embodiment thereof as illustrated in the accompanying drawing, wherein Fig. 1 is a side view of an apparatus embodying the invention, showing the apparatus attached to a sawing machine frame;

Fig. 2 is a front view of the apparatus and shows a saw in alignment with the attached gauge;

Fig. 3 is a plan view of the apparatus, partly in section, taken on the line 3—3 of Fig. 1 and showing a lateral adjustment feature;

Fig. 4 is a fragmentary front view showing relative positions of the saw with respect to the abrasive members during the various stages of operation, and Fig. 5 is a cross-sectional plan view of the fixture supporting the abrasive members taken on line 5—5 of Fig. 2.

Referring now to the drawing in detail in which like numerals designate like parts throughout the several views, there is disclosed a circular saw 10 mounted in a sawing machine, a portion of the frame of which is shown as 11. It is known that on account of stresses set up due to rapid motion a moving saw may assume a slightly different shape from a saw that is not moved at any appreciable speed, and thus for satisfactory results in dressing it is considered best to dress the saw while the saw is running at its operating speed. That the speed at which some saws operate is considerable is evidenced by the fact that some circular saws are frequently operated at 3600 R. P. M., which in the case of a saw 14 inches in diameter amounts to a peripheral speed of over two miles per minute. The sawing machine and its frame may be of any usual and suitable type adapted for suitably supporting and operating the rotating saw of a sawing machine for producing edges suitable for gluing, and no details of them are given here since the sawing machine forms no part of the invention. A base 12, rigidly secured to the frame portion 11 by means of screws 13 and 14, supports a lever arm 15 hinged thereto through an adjusting screw 20 rotatably mounted within lugs 21 and 22 integral with the base and projecting through apertures in lugs 23 and 24 integral with the lever arm. The adjusting screw 20 is provided with a knurled head 30 and has threads 25 cooperating with threads in the lug 24, and by actuation of the knurled head 30 the arm 15 will be moved lengthwise of the adjusting screw 20. A tip 31 projects from the lever arm 15 to provide a rest for the arm on the frame 11 to aid in the movement of the arm along the screw 20.

The arm 15 carries a unitary support or abrasive holding member 32 which is slidably mounted on the end of the arm by means of a trapezoidal channel 33 provided within the member 32 for receiving flanges 34 and 35 integral with the end of the arm 15. A retaining piece 40 (Fig. 3) and cooperating screws 41, engaging depressions 49 in the retaining piece, serve to rigidly secure the abrasive holding member 32 to the flanges 34 and 35 and yet to permit the member 32 to slide vertically thereon. For moving the holding member 32 along the flanges 34 and 35, an adjustment screw 42 is rotatably mounted within an aperture in a projection 43 of the holding member 32, and the threaded lower end of the adjustment screw engages threads within an aperture in an enlarged portion 47 of the arm 15 within which aperture the adjustment screw may be rotated to cause it to move vertically. Collars 44 and 45 attached to the adjustment screw 42 and abutting against the projection 43 prevent the screw 42 from moving lengthwise within the aperture in the projection 43. A knurled head 46, integral with the collar 45, serves as a means for actuating the adjustment screw 42.

Three abrasive members 50, 51 and 52 are secured within the abrasive holding member or unitary support 32. The top abrasive member 50 is adjustably retained within a groove in the support 32 by a clamp 53 which bears against the abrasive member, and the lateral abrasive members 51 and 52 are adjustably retained in grooves in supports 55 and 56 projecting downwardly from the support 32 by clamps 58 and 59 which bear against the abrasive members. By adjustably mounting the three abrasive members 50, 51 and 52 within the one holding member or unitary support 32 in the manner just stated, the position of three abrasive members may be regulated with respect to each other and in addition the three abrasives may be moved as a unit for the purpose of aligning them with the saw.

As a means for accomplishing the alignment of the abrasive members with the saw, a removable gauge 60 is attached to the bottom of the supports 55 and 56 by means of pins 67 and 68 projecting from the supports and engaging apertures in the gauge, and by screws 69 and 70 which secure the gauge 60 to the supports 55 and 56. Fig. 2 shows how the gauge 60 is used to align the apparatus. The gauge has a projection 61 from its lower portion which is provided with a groove 71 of a width equal to the width of the saw 10, and the true alignment of the abrasive holding member 32 is determined by fitting the groove 71 over the stationary saw 10. The correct relative adjustment of the lateral abrasive members 51 and 52 is determined by a projection 62 from the upper portion of the gauge 60, which projection is in direct alignment with the groove 71 fitting over the saw and is of the same width. By contacting the tips of the abrasive members 51 and 52 against the projection 62 the abrasive members are placed in correct working position.

The operation of the apparatus will now be described. For the purpose of safety the saw 10 is first made stationary, while the abrasive holding unit 32 is swung upon the arm 15 to bring the attached gauge 60 over the saw. The support 32 and the attached gauge 60 are adjusted laterally by turning the knurled head 30 until the groove 71 of the gauge will fit over the tooth of the saw as shown in Fig. 2. In order to bring the slot 71 into engagement with the saw 10 it may be necessary to lower the support 32 on the arm 15 by adjusting the knurled head 46. This engagement of the groove 71 with a saw tooth determines the correct lateral alignment of the unitary support 32 with the saw, and the gauge 60 at this stage also serves to determine the correct position of the abrasive members 51 and 52, as the operator must see that the abrasive members are in contact with the projection 62 of the gauge, which is of the same width and is placed in the same plane as the saw.

After the above mentioned lateral adjustment is completed the gauge 60 is detached from the apparatus, and with the tip 31 of the arm 15 resting on the sawing machine frame, the knurled head 46 is actuated to lower the abrasive holding unit 32 until the top of a tooth projects up between the abrasive members in the position indicated at 70 (Fig. 4). Now the saw is rotated at its normal operating speed and the knurled head 46 is then actuated to raise the holding unit 32 to raise abrasive members 51 and 52 simultaneously into engagement with the edges of the teeth, as indicated by position designated 71 (Fig. 4). It is to be noted in Fig. 4 that the different positions of the saw relative to the abrasive members have been indicated rather than the different positions of the abrasive members. The saw, of course always occupies the same position, and it is the position of the support 32 that is regulated. In order to joint the tops of the teeth the knurled head 46 is actuated to lower the support 32 and bring the abrasive member 50 into contact with the tops. This completes the shaping operation, and the saw is now stopped, the abrasive members disengaged from the teeth and the apparatus swung upon the arm 15 to make room for the operation of the sawing machine.

It is to be noted from the foregoing description that the disclosed apparatus has been designed for shaping the teeth of a saw while the saw is actuated at its normal operating speed, since a saw so actuated assumes substantially the same shape that it takes while in actual operation. Such design of course necessitates rigid construction throughout as the speeds at which some saws operate is so great as to vibrate the abrasive members were a rigid construction not provided. The invention therefore provides rigidly held abrasive members for cooperating with rapidly moving saws in order to efficiently and economically carry out its purpose. The invention has been shown and described in connection with a circular saw having swaged teeth, but the invention would apply equally as well to straight or to set teeth and would adapt itself to any saw machine to which it could be attached.

It is of course to be understood that the invention is not limited to the embodiment herein disclosed but is susceptible of various modifications without departing from the scope of the appended claims.

What is claimed is:

1. In an apparatus for shaping the teeth of a saw, wherein abrasive members are mounted in oppositely disposed supports for engaging the teeth; a gauge shaped to project between the abrasive members and having a portion adapted to engage the saw, and means for securing the gauge to the supports.

2. In an apparatus for shaping the teeth of a saw, wherein abrasive members are mounted in oppositely disposed supports for engaging the teeth; a gauge shaped to engage the saw and having a portion of predetermined thickness adapted to be inserted between abrasive members to control the spacing thereof.

In witness whereof, we hereunto subscribe our names this 7th day of April, A. D. 1928.

CLARENCE ALBERT HACH.
CHARLES IRVING HOAG.